(12) United States Patent
Sonoda

(10) Patent No.: US 8,037,359 B2
(45) Date of Patent: Oct. 11, 2011

(54) OPERATION MANAGEMENT SYSTEM HAVING A PROCESS EXECUTION APPARATUS, INFORMATION MANAGEMENT APPARATUS, AND PROCESS ANALYZING APPARATUS, PROCESS ANALYZING APPARATUS, RECORDING MEDIUM IN WHICH PROCESS ANALYSIS PROGRAM IS RECORDED, AND PROCESS ANALYSIS METHOD

(75) Inventor: Masataka Sonoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/748,863

(22) Filed: Mar. 29, 2010

(65) Prior Publication Data

US 2010/0251025 A1 Sep. 30, 2010

(30) Foreign Application Priority Data

Mar. 31, 2009 (JP) ................................. 2009-088383

(51) Int. Cl.
*G06F 11/00* (2006.01)
(52) U.S. Cl. ........................................................ 714/37
(58) Field of Classification Search .................... 714/37, 714/38, 38.1
See application file for complete search history.

(56) References Cited

U.S. PATENT DOCUMENTS

| | | | | | |
|---|---|---|---|---|---|
| 5,333,310 | A | * | 7/1994 | Sakai | 707/999.008 |
| 5,701,457 | A | * | 12/1997 | Fujiwara | 707/999.003 |
| 7,738,992 | B2 | * | 6/2010 | Takahashi et al. | 700/178 |
| 2002/0178349 | A1 | * | 11/2002 | Shibayama et al. | 712/235 |
| 2005/0015665 | A1 | * | 1/2005 | Kato et al. | 714/15 |
| 2005/0102326 | A1 | | 5/2005 | Peleg et al. | |
| 2007/0198599 | A1 | | 8/2007 | Tobies | |
| 2008/0125874 | A1 | * | 5/2008 | Takahashi et al. | 700/7 |
| 2008/0163220 | A1 | | 7/2008 | Wang et al. | |
| 2008/0244583 | A1 | | 10/2008 | Horikawa | |

FOREIGN PATENT DOCUMENTS

| | | |
|---|---|---|
| JP | 10-333929 | 12/1998 |
| JP | 2001-312413 | 11/2001 |

OTHER PUBLICATIONS

Communication issued by the UK Intellectual Property Office on Jul. 30, 2010 in the corresponding UK application.

* cited by examiner

*Primary Examiner* — Robert Beausoliel, Jr.
*Assistant Examiner* — Elmira Mehrmanesh
(74) *Attorney, Agent, or Firm* — Staas & Halsey LLP

(57) ABSTRACT

A process analyzing apparatus includes processing-identifying-information acquiring, from setting history information in which an update date and time, update-result information, and management-target identifying information, processing identifying information that is associated with the same management-target identifying information indicating that the updating processing is unsuccessful and that is associated with processing identifying information associated with an update date and time within a specific period of time from the update date and time associated with the update-result information indicating that the updating processing is unsuccessful, and failure-cause-processing estimating, from execution history information in which an execution history of each processing contained in the process is associated with the processing identifying information, processing corresponding to the processing identifying information acquired as the processing that is the cause of the failure of the processing corresponding to the processing identifying information associated with the update-result information indicating that the updating processing is unsuccessful.

4 Claims, 18 Drawing Sheets

FIG. 3

| PROCESS NAME | EXECUTION DATE AND TIME | PROCESSING ID | CONTENT OF PROCESSING | PROCESSING-RESULT INFORMATION | TICKET INFORMATION |
|---|---|---|---|---|---|
| X1 | 08.10.31 10:00.00 | X1-1 | WEB SERVER BACKUP | OK | x101 |
| | 08.10.31 10:00.00 | X1-2 | AP SERVER BACKUP | OK | x102 |
| | 08.10.31 10:10.00 | X1-3 | DB SERVER BACKUP | NG | x103 |
| | 08.10.31 10:20.00 | X1-4 | REPORT | OK | |
| | ... | ... | ... | ... | |

FIG. 6

| LOCAL ID | CI TYPE | PROPERTY ITEM | VALUE |
|---|---|---|---|
| CI_a | SERVER | IP ADDRESS | 192.168.0.4 |
| | | NAME | WEB SERVER 3 |
| | | CPU CLOCK FREQUENCY | 1.5GHz |
| | | DISK CAPACITY | 150GB |
| | | MODEL | XYZ |
| | | LOAD AVERAGE | 3.0 |
| | | AVERAGE CPU UTILIZATION | 63% |
| | | STATUS | NORMAL |
| CI_a | SWITCH | IP ADDRESS | 192.168.0.250 |
| | | NAME | SWITCH A |
| | | MODEL | SWZD1 |
| | | NUMBER OF PORTS | 20 |
| | | STATUS | NORMAL |
| CI_a | SWITCH | IP ADDRESS | 192.168.0.251 |
| | | NAME | SWITCH B |
| | | MODEL | SWZD2 |
| | | NUMBER OF PORTS | 40 |
| | | STATUS | NORMAL |
| CI_a | STORAGE | IP ADDRESS | 192.168.0.10 |
| | | NAME | NAS_1 |
| | | DISK CAPACITY | 4TB |
| | | DISK USAGE | 1.3TB |
| | | STATUS | NORMAL |

FIG. 7

| | UPDATE DATE AND TIME | LOCAL ID | UPDATE-RESULT INFORMATION | TICKET INFORMATION |
|---|---|---|---|---|
| 1 | 08.10.31 10:00.00 | CI_a | OK | x101 |
| 2 | 08.10.31 10:00.00 | CI_b | OK | x101 |
| 3 | 08.10.31 10:10.00 | CI_c | OK | x102 |
| 4 | 08.10.31 10:15.00 | CI_d | error | x103 |

FIG. 9

| LOCAL ID | X1 PROCESSING ID: TICKET INFORMATION | | | |
|---|---|---|---|---|
| | x1-1:x101 | x1-2:x102 | x1-3:x103 | x1-4:- |
| CI_a | OK | | | |
| CI_b | OK | | | |
| CI_c | | OK | | |
| CI_d | | | error | |

PROCESSING ID: TICKET INFORMATION

| LOCAL ID | | A1-1:a101 | A1-2:a102 | A1-3:a103 | A1-4:a104 |
|---|---|---|---|---|---|
| | CI(web1) | OK | | | |
| | CI(web2) | | OK | | |
| | CI(ap1) | | | OK | |
| | CI(db1) | | | | OK |

FIG. 10B

| LOCAL ID | B1 PROCESSING ID: TICKET INFORMATION | | |
| --- | --- | --- | --- |
| | B1-1:b101 | B1-2:b102 | B1-3:b103 |
| CI(web1) | | | OK |
| CI(web2) | | | OK |
| CI(ap1) | | error | |
| CI(db1) | OK | | |

| | UPDATE DATE AND TIME | LOCAL ID | UPDATE-RESULT INFORMATION | TICKET INFORMATION |
|---|---|---|---|---|
| 1 | 08.10.31 00:00.00 | CI(web1) | OK | a101 |
| 2 | 08.10.31 00:20.00 | CI(web2) | OK | a102 |
| 3 | 08.10.31 00:30.00 | CI(db1) | OK | b101 |
| 4 | 08.10.31 00:36.00 | CI(ap1) | error | b102 |
| 5 | 08.10.31 00:40.00 | CI(ap1) | OK | a103 |
| 6 | 08.10.31 00:42.00 | CI(web1), CI(web2) | OK | b103 |
| 7 | 08.10.31 00:45.00 | CI(db1) | OK | a104 |
| | ... | ... | ... | ... |

500

OPERATION MANAGEMENT SYSTEM HAVING A PROCESS EXECUTION APPARATUS, INFORMATION MANAGEMENT APPARATUS, AND PROCESS ANALYZING APPARATUS, PROCESS ANALYZING APPARATUS, RECORDING MEDIUM IN WHICH PROCESS ANALYSIS PROGRAM IS RECORDED, AND PROCESS ANALYSIS METHOD

CROSS-REFERENCE TO RELATED APPLICATIONS

This application is based upon and claims the benefit of priority of the prior Japanese Patent Application No. 2009-88383, filed on Mar. 31, 2009, the entire contents of which are incorporated herein by reference.

FIELD

Various embodiments described herein relate to an operation management system, a process analyzing apparatus, a process analysis program, and a process analysis method.

BACKGROUND

To perform an operational task, such as updating for a device, on an information processing system being a management target, an operator (e.g., a system administrator) lightens the load of the task by using a process execution apparatus that executes procedural steps for the operational task in accordance with a specific process definition. Here, one example of such an operation task performed by use of a process execution apparatus is described with reference to FIG. 16. FIG. 16 is an illustration for use in describing one example of a traditional operational task.

As illustrated in FIG. 16, a process execution apparatus 700 executes a process 750 in which procedural steps S01 to S06 for an operational task are specified based on a specific process definition on an information processing system. For example, the process execution apparatus 700 performs updating for a server device 900a contained in the information processing system in step S01 and performs updating for a server device 900b contained in the information processing system in step S02. The content and result of the processing executed in the above way are recorded as an execution history 770.

Together with execution of each processing contained in a process, the process execution apparatus 700 sets a database for managing information regarding an information processing system. One such example database is a configuration management database (CMDB) 800. The CMDB 800 stores detailed information regarding a component, such as a server device and application contained in an information processing system and a network, as a configuration item (CI). For example, CI(svr1) corresponding to the server device 900a contained in the information processing system can include, as detailed information for the server device 900a, an IP address, model, and disk capacity. In such a way, the process execution apparatus 700 executes processing contained in a process, and alters a CI corresponding to a component being the target for the processing in accordance with the content of the processing, as setting processing.

If a trouble occurs in an operational task for an information processing system, it is necessary to allocate workers to a task for addressing the problem. If influence of the trouble is very large, one may need to pay the penalty or risk losing the trust of a customer. To deal with this, measures, such as running a simulation of the occurrence of troubles, are typically taken in designing a process to reduce the incidence of troubles in the process.

However, it is difficult to ascertain all kinds of the possibility of the occurrence of troubles, and although a problem is not found in designing, some trouble may occur in executing. Thus, in order to design a process that has a low incidence of troubles, it is important to extract issues from a result of an operational task based on a process executed in the past and utilize them for process design.

Here, one example cause of a trouble that is difficult to ascertain in designing is a collision of setting processing attempts on a CMDB made by a plurality of process execution apparatuses. As illustrated in FIG. 17, one example case is discussed in which a process execution apparatus 700a executes a process 750a of backing up data for a plurality of apparatuses in an information processing system in accordance with procedural steps S11 to S16 and a process execution apparatus 700b executes a process 750b of applying a patch to the plurality of apparatuses in the information processing system in accordance with procedural steps S21 to S26.

In this case, a situation is assumed in which, while the process execution apparatus 700a is executing setting processing for the CI(svr1) on the CMDB 800 in step S11, the process execution apparatus 700b starts executing setting processing for the same CI(svr1) in step S22. In this situation, because the process execution apparatus 700a is executing the setting processing for the CI(svr1), the process execution apparatus 700b cannot finish the setting processing for the CI(svr1) and the setting ends unsuccessfully. When such a collision of setting processing attempts for a CI on a CMDB occurs, if the issue from an execution history of each process execution apparatus is extracted and it is utilized for process designing, the same trouble can be prevented (see, for example, Japanese Unexamined Patent Application Publication No. 10-333929).

SUMMARY

A process analyzing apparatus for analyzing an execution history of a process executed by a process execution apparatus for executing the process on a management target, the process analyzing apparatus includes: processing-identifying-information acquiring, from setting history information in which an update date and time being the date and time when updating processing of updating management information for the management target on which processing contained in the process is executed in accordance with the content of the processing, update-result information indicating that the updating processing is successful or unsuccessful, and management-target identifying information for identifying the management target are associated with processing identifying information for identifying the processing, processing identifying information that is associated with the same management-target identifying information as management-target identifying information associated with update-result information indicating that the updating processing is unsuccessful and that is associated with processing identifying information associated with an update date and time within a specific period of time from the update date and time associated with the update-result information indicating that the updating processing is unsuccessful; and failure-cause-processing estimating, from execution history information in which an execution history of each processing contained in the process is associated with the processing identifying information corresponding to the processing, processing corresponding to the processing identifying information acquired by the processing-identifying-information acquiring as the processing that is the cause of the failure of the processing corresponding to the processing identifying information associated with the update-result information indicating that the updating processing is unsuccessful.

The object and advantages will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 3 illustrates example execution history information stored in an execution-history storing unit;

FIG. 6 illustrates example CIs stored in a CMDB;

FIG. 7 illustrates example setting history information stored in a setting-history storing unit;

FIG. 9 illustrates example access-related information stored in an access-related storing unit;

FIG. 10A illustrates example access-related information based on an execution history of a process execution apparatus 1a;

FIG. 10B illustrates example access-related information based on an execution history of a process execution apparatus 1b;

FIG. 11 illustrates example setting history information stored in a history storing unit;

DESCRIPTION OF EMBODIMENTS

When a collision of setting attempts on a CMDB between a plurality of processes occurs, it is difficult to identify processing attempts between which the collision occurs. That is, in an execution history recorded in each process execution apparatus, only the fact that setting on a CMDB for processing executed by the apparatus is unsuccessful is recorded, so it is impossible for the apparatus to identify processing and a process containing that processing with which its processing with unsuccessful setting has collided. Thus, if a collision of setting attempts on a CMDB occurs, it is difficult to extract the issue of the collision of setting attempts and utilize it for process design for low incidence of troubles.

Embodiments of an operation management system, a process analyzing apparatus, a process analysis program, and a process analysis method disclosed by the present application are described below with reference to the drawings. Note that the present invention is not limited by the embodiments. For example, the present embodiments are described using, as one example of an information management apparatus, a CMDB management apparatus for managing a CMDB. However, the information management apparatus is not limited to the above apparatus and may be any apparatus as long as it manages information about a management target.

[1. Outline of Operation Management System]

Figure 1:
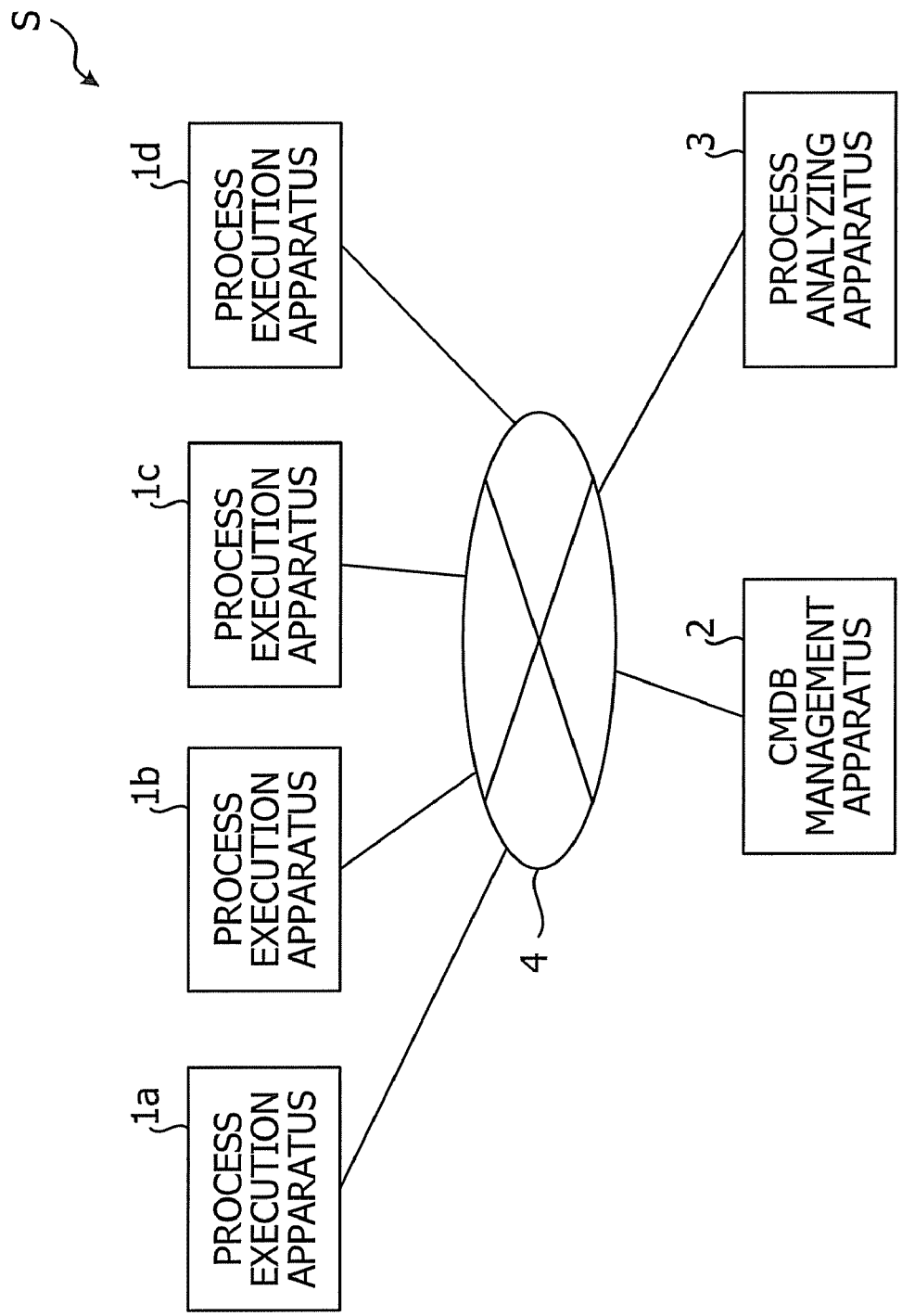
FIG. 1 is an illustration for use in describing the outline of an operation management system according to an embodiment.

In performing an operation management for an information processing system by use of a plurality of process execution apparatuses, an operation management system according to the present embodiment identifies processing attempts between which a collision of setting attempts on a CMDB occurs by analyzing an execution history of a process executed by each process execution apparatus. First, the operation management system according to the present embodiment is described with reference to FIG. 1. FIG. 1 is an illustration for use in describing the outline of the operation management system according to the present embodiment.

As illustrated in FIG. 1, in an operation management system S according to the present embodiment, a plurality of process execution apparatuses 1a to 1d, a CMDB management apparatus 2, and a process analyzing apparatus 3 are connected to one another over a network 4, such as a local area network (LAN).

Each of the process execution apparatuses 1a to 1d executes a specific process on the information processing system that contains a management target. Here, a process indicates a program in which procedural steps for an operational task on an information processing system are defined on the basis of specific process definition. For example, to perform a patch applying task on a plurality of management targets contained in the information processing system, a user of the process execution apparatus 1a causes the process execution apparatus 1a to execute a process corresponding to the patch applying task. When the process is executed, the process execution apparatus 1a executes each processing required for the patch applying task defined by process definition in accordance with a specified procedure.

The process execution apparatuses 1a to 1d perform setting processing on the CMDB management apparatus 2 in accordance with the content of processing executed on a management target contained in the information processing system. Specifically, together with execution of processing, each of the process execution apparatuses 1a to 1d transmits to the CMDB management apparatus 2 a request to update information regarding a management target being the target for that processing in accordance with the content and result of that processing. In particular, to transmit the above request, each of the process execution apparatuses 1a to 1d according to the present embodiment generates processing identifying information for identifying processing executed and transmits the above request together with the processing identifying information to the CMDB management apparatus 2. Hereinafter, such processing identifying information is referred to as "ticket information."

Each of the process execution apparatuses 1a to 1d stores, as execution history information, an execution history of the content and result of executed processing in association with ticket information corresponding to the processing for each process.

The CMDB management apparatus 2 is an information management apparatus that manages, as component information, information regarding each management target contained in the information processing system. Specifically, the CMDB management apparatus 2 has a CMDB that stores, as a configuration item (CI), information regarding a management target, such as a server device and an application contained in the information processing system and a network. For example, a CI corresponding to a server device can include, as detailed information on the server device, an IP address, model, and disk capacity. Hereinafter, detailed information contained in a CI is referred to as a property.

The CMDB management apparatus 2 updates the property of a corresponding CI on the basis of setting information acquired from each of the process execution apparatuses 1a to 1d. Here, a situation is assumed in which, while the CMDB management apparatus 2 is updating the property of a corresponding CI on the basis of setting information acquired from the process execution apparatus 1a, the CMDB management apparatus 2 acquires setting information for the same CI as the above CI from the process execution apparatus 1b. In this way, if a collision of setting processing attempts for the same CI occurs, the CMDB management apparatus 2 reports an error to the process execution apparatus 1b as updating processing based on the setting information acquired from the process execution apparatus 1b without updating the CI.

The CMDB management apparatus 2 stores a result of updating processing based on setting information from each of the process execution apparatuses 1a to 1d and the date and time of updating. Specifically, the CMDB management apparatus 2 stores, as setting history information, the date and time of executing updating processing for a CI, update-result information indicating that the updating is successful or unsuccessful, and a component identifying number for identifying a management target being the execution target for the updating in association with ticket information contained in setting information. For example, when an error is reported to the process execution apparatus 1b as updating processing based on setting information from the process execution apparatus 1b, the CMDB management apparatus 2 stores, as the setting history information, the date and time of reporting the error to the process execution apparatus 1b as the update date and time and the update-result information indicating that the updating processing is unsuccessful.

If a collision of setting attempts for a CI stored in the CMDB occurs, the process analyzing apparatus 3 identifies the cause of that setting collision by analyzing execution history information and setting history information stored in the process execution apparatuses 1a to 1d on the basis of ticket information. Specifically, the process analyzing apparatus 3 first identifies, from the setting history information stored in the CMDB management apparatus 2, a component identifying number associated with update-result information indicating that updating processing is unsuccessful (hereinafter referred to as "failure result information").

Subsequently, the process analyzing apparatus 3 identifies ticket information that is associated with the same component identifying number as the identified component identifying number and that is associated with an update date and time within a specific period of time from the update date and time associated with the identified failure result information. Then, the process analyzing apparatus 3 extracts processing corresponding to the identified ticket information as processing that is the cause of the failure of the processing corresponding to the ticket information associated with the failure result information from the execution history information stored in the process execution apparatuses 1a to 1d.

In such a way, with the operation management system S according to the present embodiment, processing in a process that is the cause of a collision with unsuccessful setting processing on a CMDB can be estimated. The estimation can be utilized for process design for low incidence of troubles by, for example, changing the design for a process that contains the identified processing.

[2.1 Configuration of Process Execution Apparatus]

Figure 2:
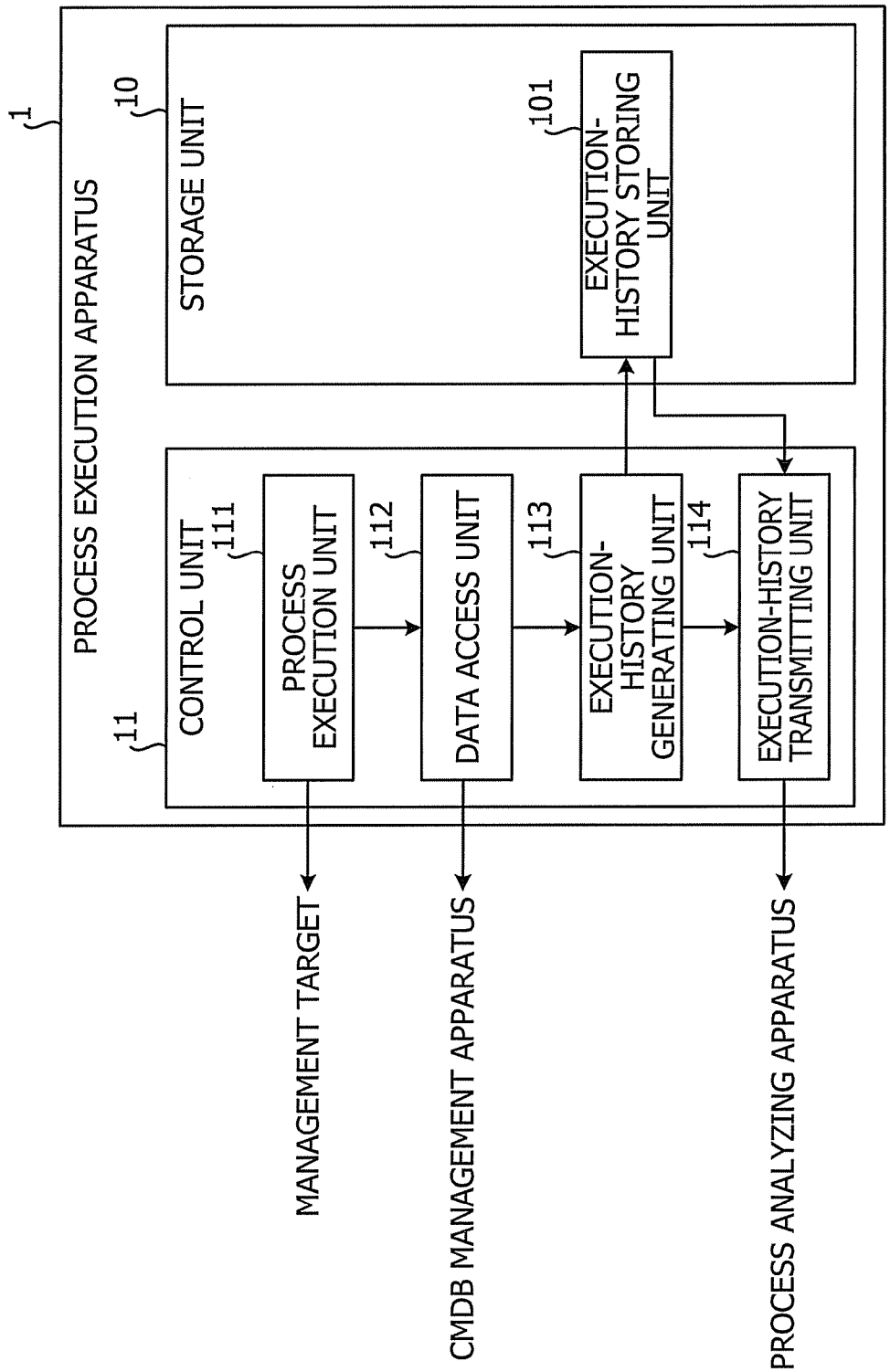
FIG. 2 is a block diagram that illustrates a configuration of a process execution apparatus according to the embodiment.

The configuration of each of the process execution apparatuses 1a to 1d is now specifically described with reference to the drawings. FIG. 2 is a block diagram that illustrates an example configuration of the process execution apparatus according to the present embodiment. Hereinafter, when any one of the process execution apparatuses 1a to 1d is discussed, it is simply represented as the process execution apparatus 1.

As illustrated in FIG. 2, the process execution apparatus 1 according to the present embodiment includes a storage unit 10 and a control unit 11. The storage unit 10 stores data and programs required for various kinds of processing to be executed by the control unit 11. The storage unit 10 includes an execution-history storing unit 101. The execution-history storing unit 101 stores an execution history of a process executed by the process execution apparatus 1. FIG. 3 illustrates example execution history information stored in the execution-history storing unit 101.

As illustrated in FIG. 3, the execution-history storing unit 101 stores, as execution history information, an execution date and time, a processing ID, the content of the processing, processing-result information, and ticket information in association with a process name being information for identifying a process. The execution date and time is a date and time when processing contained in a process was executed. The execution ID is an identification number for identifying each processing in the process execution apparatus 1. The processing-result information is information indicating that each processing is successful or unsuccessful; it shows "OK" for success and "NG" for failure. The ticket information is information for uniquely identifying each processing among the process execution apparatuses 1a to 1d and is generated by a data access unit 112, which is described below. The details of the ticket information are described below.

For example, the processing of the processing ID "X-1" contained in the process name "X1" is "web server backup" processing that was executed at "10:00:00 on Oct. 31, 2008" and is assigned the ticket information "x101." In this way, the execution-history storing unit 101 corresponds to execution-history storing means for storing an execution history of each processing contained in a process in association with process-identifying information corresponding to the processing, as execution history information. In the present embodiment, a process name is used as information for identifying a process. However, such information is not limited to the process name. For example, an ID can also be used.

The control unit 11 exercises control over the process execution apparatus 1. The control unit 11 includes a process execution unit 111, a data access unit 112, an execution-history generating unit 113, and an execution-history transmitting unit 114.

The process execution unit 111 executes a process in which procedural steps for an operational task on an information processing system are defined on the basis of specific process definition. The data access unit 112 performs setting processing on a CMDB 201, which is described below, together with execution of processing contained in a process. Specifically, together with execution of processing contained in a process, the process execution apparatus 1 transmits an update request to update a CI corresponding to a management target for the processing in accordance with the content of the processing to the CMDB management apparatus 2. In particular, in such a case, the process execution apparatus 1 generates ticket information for identifying the processing and transmits the update request and the ticket information as setting information to the CMDB management apparatus 2.

For example, as illustrated in FIG. 3, to execute processing to which the processing ID "X1-1" is assigned, the process execution apparatus 1 generates the ticket information "x101" corresponding to the processing. Then, the process execution apparatus 1 transmits an update request to update a CI corresponding to a management target for the processing in accordance with the content of the processing to the CMDB management apparatus 2 over the network 4.

Here, ticket information is information that uniquely identifies processing corresponding to the ticket information among a plurality of process execution apparatuses, and in the present embodiment, it is a number in which a process name of a process that contains the processing and the order in which the processing is executed in the process are combined. Note that the ticket information is not limited to the above number. For example, the ticket information can be a combination of an apparatus name uniquely assigned to the process execution apparatuses 1, processing ID, and execution date and time.

Figure 4:
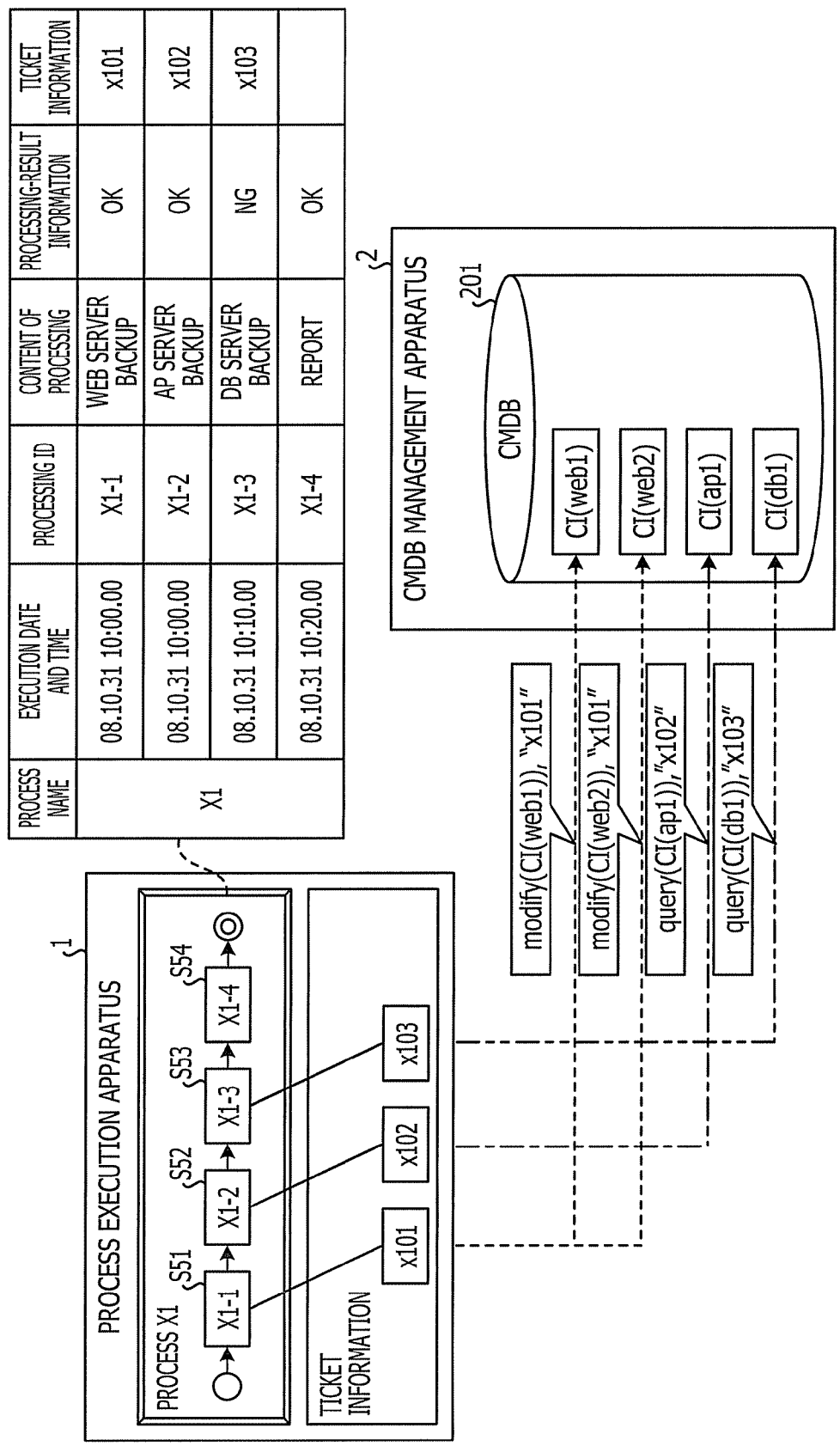
FIG. 4 is an illustration for use in describing processing performed by a data access unit and an execution-history generating unit.

The execution-history generating unit 113 stores, as execution history information, an execution history of a process executed by the process execution unit 111 in the execution-history storing unit 101 for each process. Here, setting processing performed by the data access unit 112 and execution history storing processing performed by the execution-history generating unit 113 are described with reference to the drawings. FIG. 4 is an illustration of use in describing processing performed by the data access unit 112 and the execution-history generating unit 113.

For example, as illustrated in FIG. 4, the process execution unit 111 executes, on the information processing system, a process "X1" including web server backup processing S51 indicated by the processing ID "X1-1," AP server backup processing S52 indicated by "X1-2," DB server backup processing S53 indicated by "X1-3," and report processing S54 indicated by "X1-4."

In such a case, the data access unit 112 first generates the ticket information "x101" for identifying the processing S51 together with the execution of the processing S51 indicated by the processing ID "X1-1" by the process execution unit 111. Then, the data access unit 112 transmits a request to update a CI(web1) and a CI(web2) corresponding to components being the management target for the processing S51 in accordance with the content of the processing, together with the generated ticket information "x101," as setting information to the CMDB management apparatus 2.

Subsequently, when the processing S51 ends, the process execution unit 111 executes the processing S52. In such a case, the data access unit 112 generates the ticket information "x102" for identifying the processing S52 together with the execution of the processing S52 by the process execution unit 111. Then, the data access unit 112 transmits a request to update a CI(ap1) corresponding to a component being the management target for the processing S52 in accordance with the content of the processing, together with the generated ticket information "x102," as setting information to the CMDB management apparatus 2.

Subsequently, when the processing S52 ends, the process execution unit 111 executes the processing 853. In such a case, the data access unit 112 generates the ticket information "x103" for identifying the processing S53 together with the execution of the processing S53 by the process execution unit 111. Then, the data access unit 112 transmits a request to update a CI(db1) corresponding to a component being the management target for the processing S53 in accordance with the content of the processing, together with the generated ticket information "x103," as setting information to the CMDB management apparatus 2.

Subsequently, when the processing S53 ends, the process execution unit 111 executes the processing S54. If this processing executed by the process execution unit 111 is processing that requires no access to the CMDB management apparatus 2, such as report processing for reporting completion of the process, the data access unit 112 generates no ticket information for that processing.

In such a way, the data access unit 112 functions as setting-information transmitting means for transmitting, to the information management apparatus, an update request to update management information corresponding to a management target for processing in accordance with the content of the processing for each processing contained in a process, together with processing identifying information for identifying the processing, as setting information.

Every time processing contained in a process is completed, the execution-history generating unit 113 stores an execution history of that processing in the execution-history storing unit 101. Specifically, the execution-history generating unit 113 stores the date and time of processing, processing ID assigned to the processing, the content of the processing, and processing-result information indicating that the processing is successful or unsuccessful in association with ticket information generated with setting processing based on the above processing.

For example, every time any one of the processing S51 to processing S54 contained in the process X1 is completed, the execution-history generating unit 113 stores an execution history of that processing in the execution-history storing unit 101. First, when the processing S51 is completed, the execution-history generating unit 113 stores an execution history of the processing S51 in the execution-history storing unit 101. Specifically, the execution-history generating unit 113 stores, in the execution-history storing unit 101, the date and time "08.10.31 10:00.00" which is the time of completion of the processing S51 as the execution date and time for the processing S51, the processing ID "X1-1," the content of the processing "web server backup," the processing-result information "OK," and the ticket information "x101" in association with the process name "X1."

When the processing S52 is completed, the execution-history generating unit 113 stores the execution date and time "08.10.31 10:00.00" of the processing S52, the processing ID "X1-2," the content of the processing "AP server backup," the execution result information "OK," and the ticket information "x102" in association with the process name "X1." When the processing S53 is completed, the execution-history generating unit 113 stores the execution date and time "08.10.31 10:10.00" of the processing S53, the processing ID "X1-3," the content of the processing "DB server backup," the execution result information "NG," and the ticket information "x103" in association with the process name "X1." When the processing 854 is completed, the execution-history generating unit 113 stores the execution date and time "08.10.31

10:20.00" of the processing S54, the processing ID "X1-4," the content of the processing "report," and the execution result information "OK" in association with the process name "X1."

The execution-history transmitting unit 114 transmits execution history information generated by the execution-history generating unit 113 to the process analyzing apparatus 3 over the network 4 at specific timing.

[2.2 Configuration of CMDB Management Apparatus]

Figure 5:
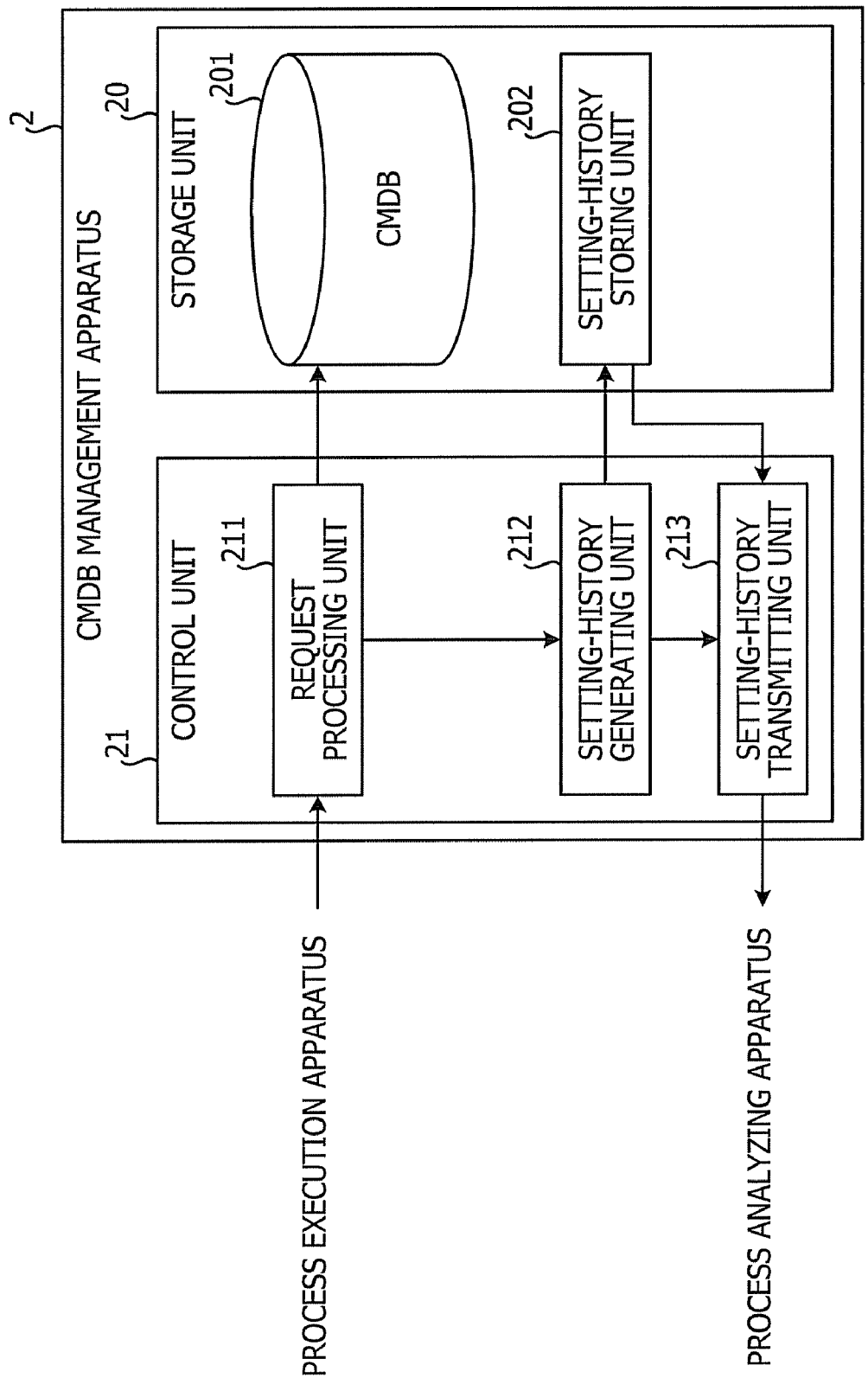
FIG. 5 is a block diagram that illustrates a configuration of a CMDB management apparatus according to the embodiment.

The configuration of the CMDB management apparatus 2 according to the present embodiment is now specifically described with reference to the drawings. FIG. 5 is a block diagram that illustrates an example configuration of the CMDB management apparatus 2 according to the present embodiment.

As illustrated in FIG. 5, the CMDB management apparatus 2 according to the present embodiment includes a storage unit 20 and a control unit 21. The storage unit 20 stores data and programs required for various kinds of processing to be executed by the control unit 21. The storage unit 20 includes the CMDB 201 and a setting-history storing unit 202.

The CMDB 201 stores a CI as information regarding a management target contained in an information processing system. FIG. 6 illustrates example CIs stored in the CMDB 201. As illustrated in FIG. 6, the CMDB 201 stores, as a CI of a management target, a CI type indicating the type of the CI, an item of a property that is detailed information of the management target, and the value of the property in association with a local ID. The local ID is management-target identifying information that uniquely identifies a management target corresponding to a CI in the CMDB management apparatus 2.

For example, a CI to which the local ID "CI_a" is assigned indicates detailed information regarding a server device whose name is "web server 3." For example, such a CI includes the IP address "192.168.0.4" of the web server 3, the disk capacity "150 GB," the model "XYZ," and the status "normal." The CIs illustrated in FIG. 6 are merely examples, and information other than the one illustrated in FIG. 6 can also be stored in the CMDB 201.

The setting-history storing unit 202 stores history information for updating processing for a CI executed on the basis of setting information acquired from the process execution apparatus 1. FIG. 7 illustrates example setting history information stored in the setting-history storing unit 202. As illustrated in FIG. 7, the setting-history storing unit 202 stores, as setting history information, a local ID, update-result information, and ticket information in association with an update date and time.

The local ID is the local ID of a CI corresponding to a component on which processing was executed by the process execution unit 111 of the process execution apparatus 1. The update date and time is the date and time when updating processing for a CI corresponding to a management target for processing was executed on the basis of setting information transmitted from the process execution apparatus 1 by a request processing unit 211, which is described below. If the updating processing by the request processing unit 211 fails because of, for example, a collision with a setting attempt corresponding to another processing, the date and time when the failure of the updating processing was reported to the process execution apparatus 1 that had transmitted setting information is considered as the execution date and time. The update-result information is information indicating that corresponding processing is successful or unsuccessful. The ticket information is the one contained in setting information transmitted from the process execution apparatus 1.

For example, as illustrated in FIG. 7, updating processing for a CI performed on the local ID "CI_a" at "10:00:00 on Oct. 31, 2008" is associated with the ticket information "x101," and the updating processing is successful. In such a way, the setting-history storing unit 202 corresponds to setting-history storing unit for storing, as setting history information, the update date and time of updating processing on management information, management-target identifying information for identifying the management target corresponding to the management information being the target for the updating processing, and update-result information indicating that the updating processing is successful or unsuccessful in association with processing identifying information contained in setting information.

The control unit 21 exercises control over the CMDB management apparatus 2. The control unit 21 includes the request processing unit 211, a setting-history generating unit 212, and a setting-history transmitting unit 213. The request processing unit 211 acquires setting information transmitted from the data access unit 112 of the process execution apparatus 1 over the network 4. The request processing unit 211 updates the property of a corresponding CI stored in the CMDB 201 on the basis of the acquired setting information. For example, when acquiring setting information that contains a request to update the property of the CI(web1) in accordance with the content of the processing S51 from the process execution apparatus 1, the request processing unit 211 updates the property of the CI(web1) in accordance with the content of the processing S51 on the basis of that setting information.

As described above, when a collision between setting processing attempts on the same CI occurs, the request processing unit 211 only reports an error to the process execution apparatus 1 that has transmitted later setting information as updating processing for the later setting information. In such a way, the request processing unit 211 functions as management-information updating means for updating corresponding updating management information on the basis of setting information acquired from the process execution apparatus 1.

The setting-history generating unit 212 stores, in the setting-history storing unit 202, setting history information based on updating processing on the CMDB 201 performed by the request processing unit 211. Specifically, when updating processing on the CMDB 201 by the request processing unit 211 is completed, the setting-history generating unit 212 stores the local ID of a CI that is the target for that updating processing, update-result information indicating that the updating processing is successful or unsuccessful, and ticket information contained in setting information in association with the update date and time of that updating processing. For example, if processing performed on the CI with the local ID "CI_d" at "08.10.31 10:15.00" fails because of the occurrence of a collision of setting attempts against processing contained in another process, the setting-history generating unit 212 stores "error" as update-result information for that unsuccessful processing.

The setting-history transmitting unit 213 transmits setting history information generated by the setting-history generating unit 212 to the process analyzing apparatus 3 over the network 4 at specific timing.

[2.3 Configuration of Process Analyzing Apparatus]

Figure 8:
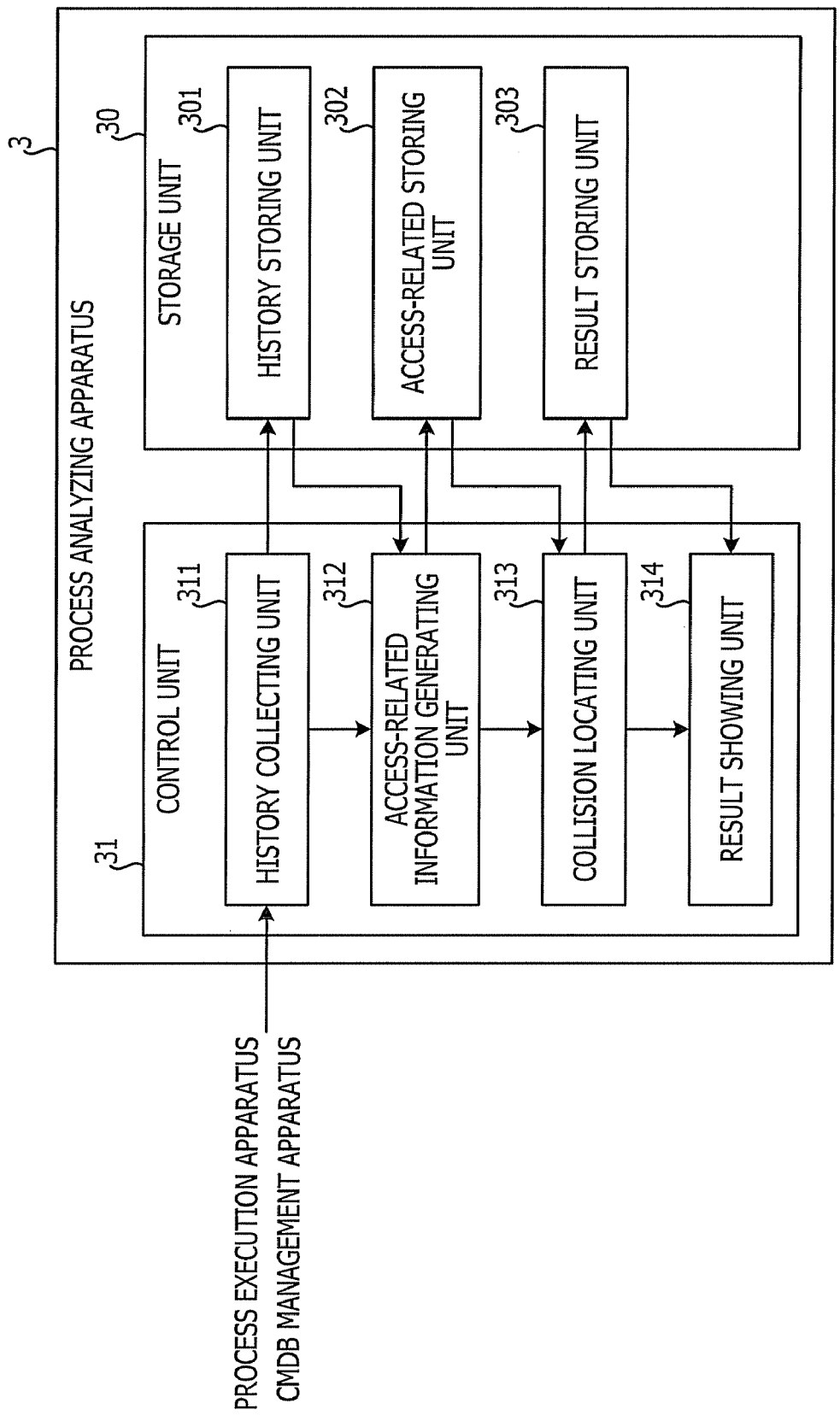
FIG. 8 is a block diagram that illustrates a configuration of a process analyzing apparatus according to the embodiment.

The configuration of the process analyzing apparatus 3 according to the present embodiment is now specifically described with reference to the drawings. FIG. 8 is a block diagram that illustrates an example configuration of the process analyzing apparatus 3 according to the present embodiment. As illustrated in FIG. 8, the process analyzing apparatus 3 according to the present embodiment includes a storage unit 30 and a control unit 31.

The storage unit 30 stores data and programs required for various kinds of processing to be executed by the control unit 31. The storage unit 30 includes a history storing unit 301, an access-related storing unit 302, and a result storing unit 303. The history storing unit 301 stores execution history information collected from the process execution apparatuses 1a to 1d and setting history information collected from the CMDB management apparatus 2 by a history collecting unit 311, which is described below.

The access-related storing unit 302 stores access-related information generated by an access-related information generating unit 312, which is described below, on the basis of the execution history information and setting history information stored in the history storing unit 301. FIG. 9 illustrates example access-related information stored in the access-related storing unit 302.

As illustrated in FIG. 9, the access-related storing unit 302 stores a process name, processing ID and ticket information that correspond to processing contained in a process corresponding to the process name, and a local ID of a management target being the target for that processing in association with update-result information of updating processing for the CI executed in relation to that processing.

For example, the access-related information illustrated in FIG. 9 indicates that the processing having the processing ID "X1-2" contained in the process X1 is processing on a management target corresponding to the CI identified by "CI_c" corresponds to the ticket information "x102," and indicates that updating processing for the CI executed in relation to that processing is successful. The access-related information is generated by the access-related information generating unit 312 for each execution history information acquired from the process execution apparatuses 1a to 1d, i.e., for each process executed by the process execution apparatuses 1a to 1d and is stored in the access-related storing unit 302.

The result storing unit 303 stores a result of processing performed by a collision locating unit 313, which is described below. Specifically, the result storing unit 303 stores a processing ID and a process name of processing in which updating processing of its CI is unsuccessful, a processing ID and a process name of processing extracted as the cause of the failure of that updating processing by the collision locating unit 313, which is described below, and the local ID of the CI being the target for that updating processing such that they are associated with one another. Such result information is stored in the result storing unit 303 by the collision locating unit 313, which is described below.

The control unit 31 exercises control over the process analyzing apparatus 3. The control unit 31 includes the history collecting unit 311, the access-related information generating unit 312, the collision locating unit 313, and a result showing unit 314.

The history collecting unit 311 acquires execution history information from each of the process execution apparatuses 1a to 1d over the network 4. The history collecting unit 311 also acquires setting history information from the CMDB management apparatus 2 over the network 4. The history collecting unit 311 can acquire each of execution history information and setting history information at any timing. For example, the execution history information and setting history information can be collected from the process execution apparatuses 1a to 1d and the CMDB management apparatus 2, respectively, at regular intervals. Alternatively, every time a process is completed, the process execution apparatuses 1a to 1d can transmit execution history information for the completed process to the history collecting unit 311. Alternatively, the information can be collected in response to an instruction from a user of the process analyzing apparatus 3.

In such a way, the history collecting unit 311 corresponds to execution-history acquiring means for acquiring execution history information from the process execution apparatus 1 and setting-history acquiring means for acquiring setting history information from the information management apparatus.

The access-related information generating unit 312 generates access-related information on the basis of execution history information and setting history information acquired by the history collecting unit 311. The processing of generating access-related information performed by the access-related information generating unit 312 is described below with reference to FIGS. 3, 7, and 9.

First, the access-related information generating unit 312 extracts execution history information illustrated in FIG. 3 from execution history information stored in the history storing unit 301. Then, the access-related information generating unit 312 selects one column from the extracted execution history information and extracts the processing ID and ticket information stored in the selected column. For example, the access-related information generating unit 312 selects the column of processing regarding "web server backup" from the execution history illustrated in FIG. 3 and extracts the processing ID "X1-1" and the ticket information "x101" from the selected column.

Then, the access-related information generating unit 312 searches setting history information stored in the history storing unit 301 on the basis of the extracted ticket information and identifies the column in which the same ticket information as the extracted ticket information is contained. The access-related information generating unit 312 extracts the local ID of the CI and the update-result information from the identified column. For example, if the extracted ticket information is "x101," the access-related information generating unit 312 extracts, from setting history information stored in the history storing unit 301, the combination of the local ID "CI_a" and the update-result information "OK" and the combination of the local ID "CI_b" and the update-result information "OK."

Then, the access-related information generating unit 312 stores the extracted processing ID, ticket information, and local ID in association with the update-result information. For example, the access-related information generating unit 312 stores the processing ID "X1-1," ticket information "x101," and local ID "CI_a" in association with the update-result information "OK." Similarly, the access-related information generating unit 312 stores the processing ID "X1-1," ticket information "x101," and local ID "CI_b" in association with the update-result information "OK." The access-related information generating unit 312 generates access-related information for the extracted execution history information by performing the above processing on all columns in the extracted execution history information. The access-related information generating unit 312 performs similar processing on all execution history information stored in the history storing unit 301.

The access-related information generating unit 312 can perform the processing of generating access-related information at any timing. For example, the access-related information generating unit 312 can perform the processing of generating access-related information at regular intervals. Alternatively, the access-related information generating unit 312 can perform the processing of generating access-related information every time execution history information is acquired from the process execution apparatus 1. Alternatively, the access-related information generating unit 312 can perform the processing of generating access-related information in response to an instruction from a user of the process analyzing apparatus 3.

In such a way, the access-related information generating unit 312 corresponds to access-related information generating means for, for each processing identifying information contained in execution history information acquired by the execution-history acquiring means, extracting management-target identifying information and update-result information that are associated with the same processing identifying information as the above processing identifying information from setting history information acquired by the setting-history acquiring means and generating access-related information in which the extracted management-target identifying information and update-result information are associated with the processing identifying information.

The collision locating unit 313 estimates processing and a process that contains the processing with which processing in which its setting processing on the CMDB 201 is unsuccessful has collided, on the basis of the access-related information generated by the access-related information generating unit 312 and the execution history information and setting history information stored in the history storing unit 301. The processing of locating a collision performed by the collision locating unit 313 is described below with reference to the drawings.

FIG. 10A illustrates example access-related information based on an execution history of the process execution apparatus 1a; FIG. 10B illustrates example access-related information based on an execution history of the process execution apparatus 1b. FIG. 11 illustrates example setting history information stored in the history storing unit 301.

For example, as illustrated in FIG. 10A, the access-related storing unit 302 stores access-related information 400a generated on the basis of execution history information regarding the process A1 executed by the process execution apparatus 1a. Specifically, in the access-related information 400a, the processing ID "A1-1," ticket information "a101," and local ID "CI(web1)" are stored in association with the update-result information "OK." Similarly, in the access-related information 400a, the processing ID "A1-2," ticket information "a102," and local ID "CI(web2)" are stored in association with the update-result information "OK." Similarly, in the access-related information 400a, the processing ID "A1-3," ticket information "a103," and local ID "CI(ap1)" are stored in association with the update-result information "OK." Similarly, in the access-related information 400a, the processing ID "A1-4," ticket information "a104," and local ID "CI(db1)" are stored in association with the update-result information "OK."

As illustrated in FIG. 10B, the access-related storing unit 302 stores access-related information 400b generated on the basis of execution history information regarding the process B1 executed by the process execution apparatus 1b. Specifically, in the access-related information 400b, the processing ID "B1-1," ticket information "b101," and local ID "CI(db1)" are stored in association with the update-result information "OK." Similarly, in the access-related information 400b, the processing ID "B1-2," ticket information "b102," and local ID "CI(ap1)" are stored in association with the update-result information "error." Similarly, in the access-related information 400b, the processing ID "B1-3," ticket information "b103," and local ID "CI(web1)" are stored in association with the update-result information "OK." Similarly, in the access-related information 400b, the processing ID "B1-3," ticket information "b103," and local ID "CI(web2)" are stored in association with the update-result information "OK."

As illustrated in FIG. 11, the history storing unit 301 stores setting history information 500 regarding updating processing of a CI executed on the basis of setting information acquired from the process execution apparatuses 1a to 1d. Specifically, in the setting history information 500, the update date and time "08.10.31 00:00.00," local ID "CI(web1)," and update-result information "OK" are stored in association with the ticket information "a101." In the setting history information 500, the update date and time "08.10.31 00:20.00," local ID "CI(web2)," and update-result information "OK" are stored in association with the ticket information "a102." In the setting history information 500, the update date and time "08.10.31 00:30.00," local ID "CI(db1)," and update-result information "OK" are stored in association with the ticket information "b101."

In the setting history information 500, the update date and time "08.10.31 00:36.00," local ID "CI(ap1)," and update-result information "error" are stored in association with the ticket information "b102." In the setting history information 500, the update date and time "08.10.31 00:40.00," local ID "CI(ap1)," and update-result information "OK" are stored in association with the ticket information "a103." In the setting history information 500, the update date and time "08.10.31 00:42.00," local ID "CI(web1)," local ID "CI(web2)," and update-result information "OK" are stored in association with the ticket information "b103." In the setting history information 500, the update date and time "08.10.31 00:45.00," local ID "CI(db1)," and update-result information "OK" are stored in association with the ticket information "a104."

In such a case, the collision locating unit 313 first identifies processing in which updating processing of its CI is unsuccessful from the access-related information 400a and 400b stored in the access-related storing unit 302. Specifically, the collision locating unit 313 extracts, from the access-related information 400b, the processing ID "B1-2," process name "B1," and ticket information "b102" associated with the update-result information "error." In such a way, the collision locating unit 313 functions as failure-processing extracting means for extracting processing identifying information associated with update-result information indicating that updating processing is unsuccessful from access-related information generated by the access-related information generating means.

Subsequently, the collision locating unit 313 identifies the column in which the identified ticket information is contained from setting history information. Then, the collision locating unit 313 identifies the column in which the same local ID as the local ID contained in the identified column from among columns that contain an execution date and time within a specific period of time from the execution date and time stored in the identified column. The collision locating unit 313 extracts ticket information stored in the identified column.

Specifically, the collision locating unit 313 identifies the execution date and time "08.10.31 00:36.00" and local ID "CI(ap1)" associated with the ticket information "b102" from the setting history information 500. Then, the collision locating unit 313 identifies the column that contains the local ID "CI(ap1)" from among columns that contain an execution date and time within 10 minutes before and after the identified "08.10.31 00:36:00" and extracts the ticket information "a103" from the identified column.

In such a way, the collision locating unit 313 functions as processing-identifying-information acquiring means for acquiring, from the above setting history information, processing identifying information that is associated with the same management-target identifying information as management-target identifying information associated with failure result information and that is associated with an update date and time within a specific period of time from the update date and time associated with the failure result information. In the foregoing example, the condition of within 10 minutes before and after the update date and time associated with new result information that indicates that updating processing is unsuccessful is used as a specific period of time. However, the specific period of time is not limited to the above condition, and any period of time can be used.

Then, the collision locating unit 313 extracts, from access-related information, processing corresponding to the extracted ticket information as the processing that is the cause of the failure of the processing corresponding to the ticket information associated with the failure result information. For example, the collision locating unit 313 searches the access-related information 400a and 400b and extracts the processing ID "A1-3," process name "A1," and local ID "CI (ap1)" corresponding to the extracted ticket information "a103" from the access-related information 400a. The collision locating unit 313 can also acquire such information from the execution history information stored in the history storing unit 301, not from the access-related information 400a.

The collision locating unit 313 stores, as result information, the processing ID and process name of the processing in which updating processing of its CI is unsuccessful, the processing ID and process name extracted as the cause of the failure of that updating processing, and the local ID of the CI being the target of that updating processing such that they are associated with one another in the result storing unit 303. Specifically, the collision locating unit 313 stores the processing ID "B1-2" and process name "B1" and the processing ID "A1-3" and process name "A1" in association with and the local ID "CI(ap1)" in the result storing unit 303, In such a way, the collision locating unit 313 functions as failure-cause-processing estimating means for extracting, from execution history information, processing corresponding to processing identifying information acquired by the processing-identifying-information acquiring means as processing that is the cause of the failure of processing corresponding to processing identifying information associated with update-result information that indicates that updating processing is unsuccessful. The collision locating unit 313 can perform the above processing at any timing. For example, the collision locating unit 313 can perform the processing at regular intervals. Alternatively, the collision locating unit 313 can perform the processing every time access-related information is generated by the access-related information generating unit 312. Alternatively, the collision locating unit 313 can perform the processing in response to an instruction from a user of the process analyzing apparatus 3.

Figure 12:
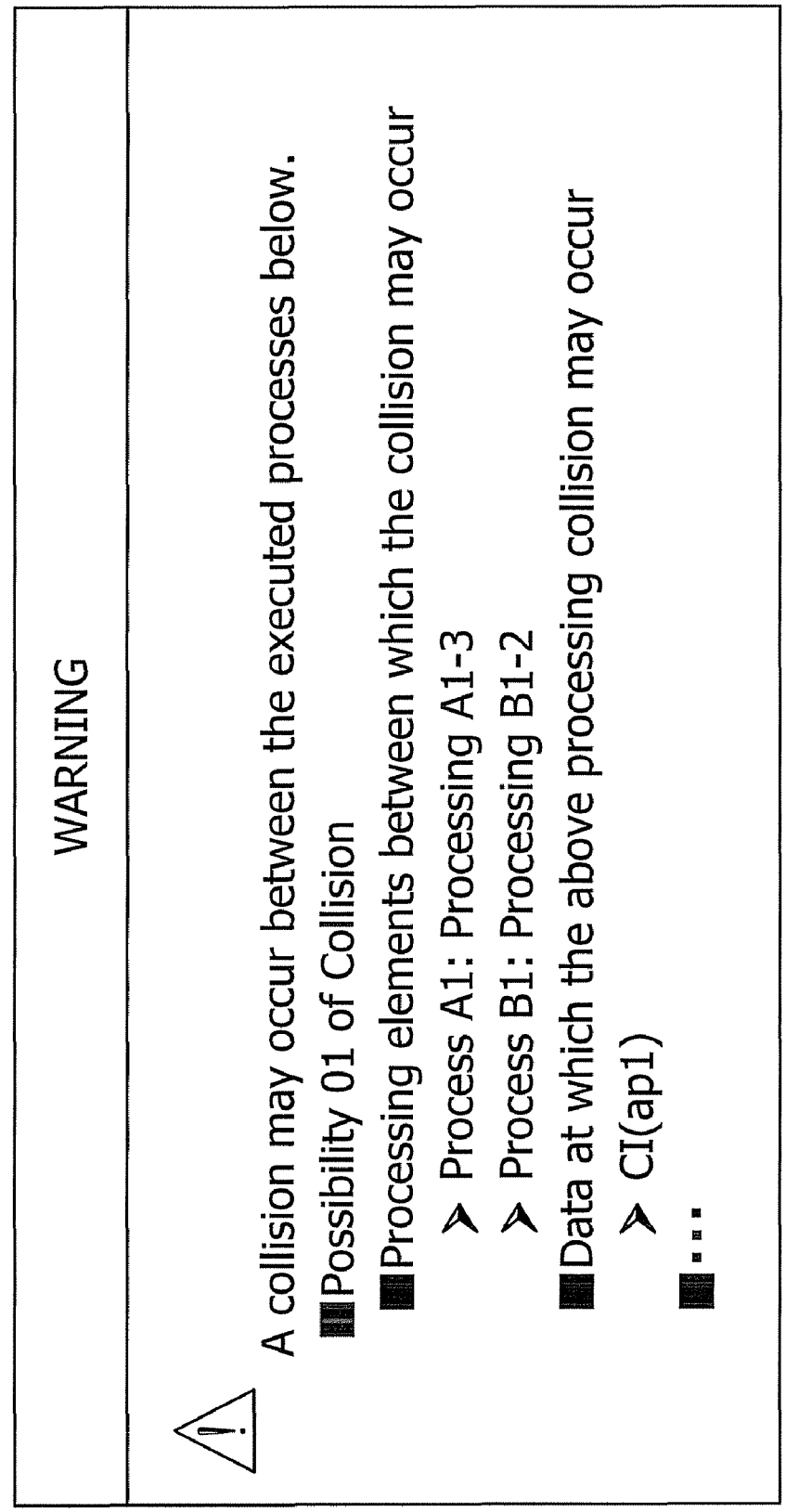
FIG. 12 illustrates example result information shown by a result showing unit.

The result showing unit 314 shows result information stored in the result storing unit 303 by the collision locating unit 313. Specifically, the result showing unit 314 displays result information stored in the result storing unit 303 on a display (not illustrated) included in the process analyzing apparatus 3. FIG. 12 illustrates example result information shown by the result showing unit 314. As illustrated in FIG. 12, the result showing unit 314 displays the possibility of the occurrence of a collision between two processing elements extracted by the collision locating unit 313. This is specifically described by use of one example case where result information in which the processing ID "B1-2" and process name "B1" and the processing ID "A1-3" and process name "A1" are associated with the local ID "CI(ap1)" is stored in the result storing unit 303. In this case, the result showing unit 314 displays "process A1: processing A1-3" and "process B1: processing B1-2" as processing elements between which a collision may have occurred on the display. The result showing unit 314 also displays "CI(ap1)" as data at which the above processing collision may occur on the display. The display may also be one included in an apparatus other than the process analyzing apparatus 3. In such a case, the result showing unit 314 transmits result information to that apparatus over a network.

[Concrete Operation of Process Analyzing Apparatus]

Figure 13:
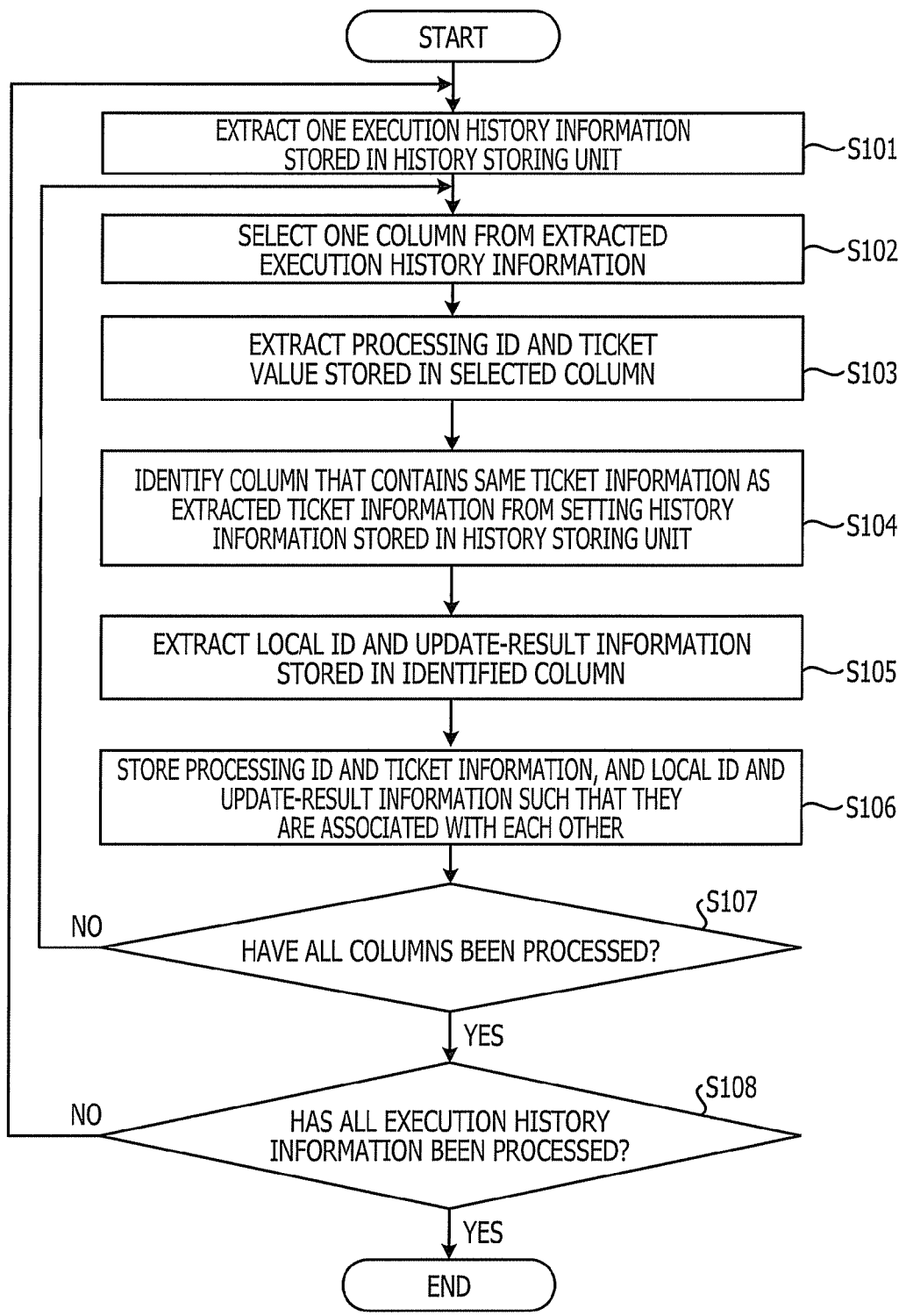
FIG. 13 is a flowchart that illustrates procedural steps for processing of generating access-related information according to the embodiment.

Concrete operation of the process analyzing apparatus 3 according to the present embodiment is now described with reference to the drawings. First, the processing of generating access-related information performed by the access-related information generating unit 312 is described. FIG. 13 is a flowchart that illustrates procedural steps for the processing of generating access-related information according to the present embodiment. In the following description, it is assumed that the history storing unit 301 has execution history information collected from the process execution apparatuses 1a to 1d and setting history information collected from the CMDB management apparatus 2 by the history collecting unit 311.

For example, when the processing of generating access-related information starts in response to an instruction from a user of the process analyzing apparatus 3, in step S101, the access-related information generating unit 312 extracts one execution history information stored in the history storing unit 301, as illustrated in FIG. 13. Subsequently, in step S102, the access-related information generating unit 312 selects one column from the extracted execution history information.

Subsequently, in step S103, the access-related information generating unit 312 extracts the processing ID and ticket value from the selected column. Subsequently, in step S104, the access-related information generating unit 312 searches setting history information stored in the history storing unit 301 on the basis of the extracted ticket information and identifies the column that contains the same ticket information as the extracted ticket information.

Subsequently, in step S105, the access-related information generating unit 312 extracts the local ID and update-result information of the CI stored in the column identified in step S104. Subsequently, in step S106, the access-related information generating unit 312 stores the processing ID and ticket information extracted in step S103 and the local ID and update-result information extracted in step S105 such that they are associated with each other in the history storing unit 301.

Subsequently, in step S107, the access-related information generating unit 312 determines whether steps S102 to S106 have been performed on all of the columns contained in the execution history information extracted in step S101. If there is an unprocessed column (NO in step S107), the access-related information generating unit 312 moves the processing to step S102; If it is determined that all of the columns has been processed (YES in step S107), the access-related information generating unit 312 moves the processing to step S108.

In step S108, the access-related information generating unit 312 determines whether steps S101 to S107 have been performed on all of the execution history information items stored in the history storing unit 301. If there is an unprocessed execution history information item (NO in step S108), the access-related information generating unit 312 moves the processing to step S101; If it is determined that all of the execution history information items has been processed (YES in step S108), the access-related information generating unit 312 finishes the processing of generating access-related information.

Figure 14:
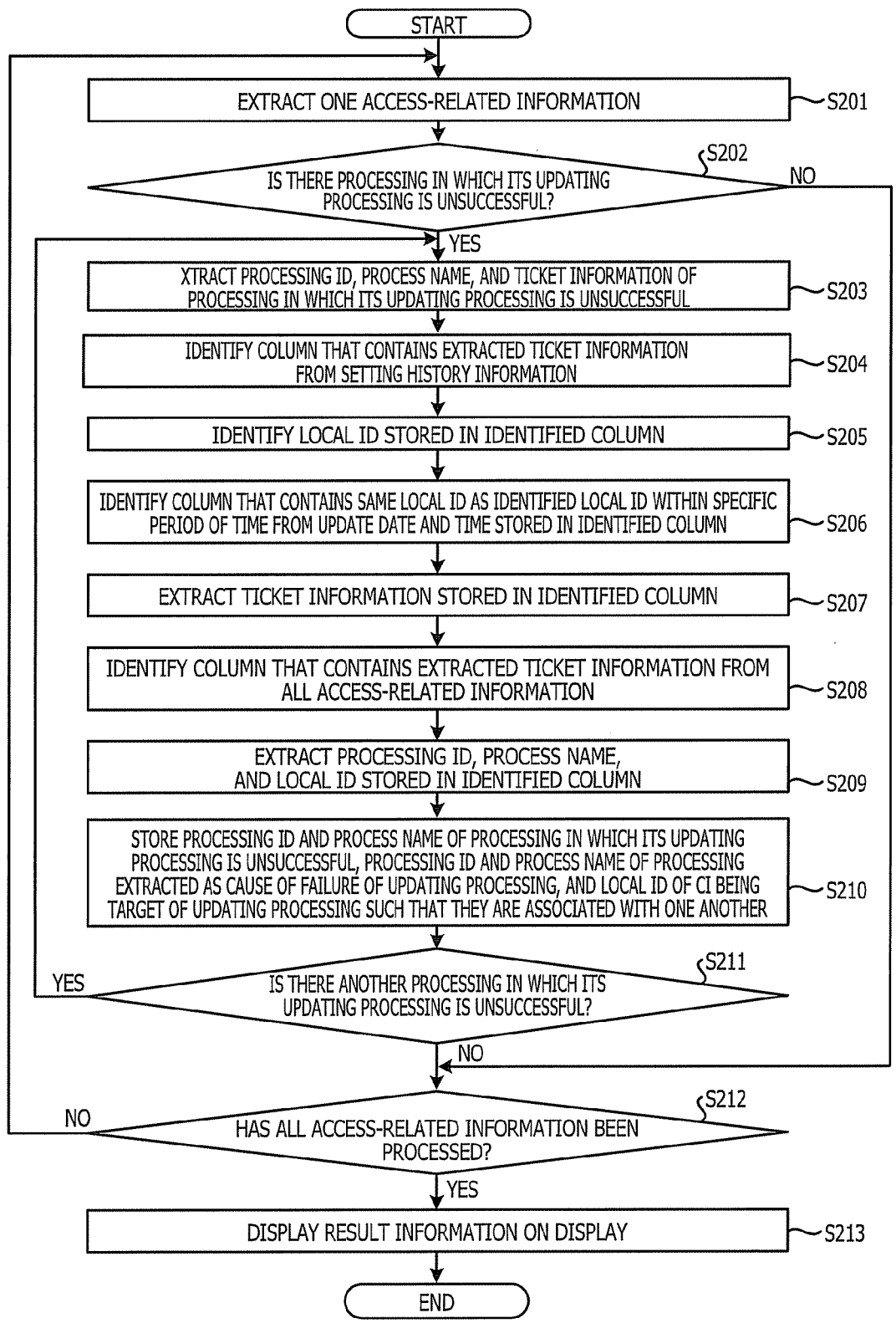
FIG. 14 is a flowchart that illustrates procedural steps for process of locating a collision according to the embodiment.

Next, procedural steps for the processing of locating a collision are specifically described. FIG. 14 is a flowchart that illustrates procedural steps for the processing of locating a collision according to the present embodiment.

As illustrated in FIG. 14, when the processing of locating a collision starts, in step S201, the collision locating unit 313 extracts one access-related information stored in the access-related storing unit 302. Subsequently, in step S202, the collision locating unit 313 determines whether the extracted access-related information contains processing in which updating processing of its CI is unsuccessful. Specifically, the collision locating unit 313 determines whether update-result information indicating that updating processing is unsuccessful is contained in the extracted access-related information. If it is determined that processing in which updating processing of its CI is unsuccessful is contained (YES in step S202), the collision locating unit 313 moves the processing to step S203.

In step S203, the collision locating unit 313 extracts the processing ID, process name, and ticket information that are associated with the update-result information indicating that updating processing is unsuccessful from the access-related information extracted in step S201. Subsequently, the access-related information generating unit 312 identifies the column that contains the extracted ticket information from setting history information in step S204 and identifies the local ID contained in the identified column in step S205.

Subsequently, in step S206, the collision locating unit 313 identifies the column that contains the same local ID as the local ID identified in step S205 from among columns that contain an execution date and time within a specific period of time from the execution date and time contained in the column identified in step S204. Then, in step S207, the collision locating unit 313 extracts ticket information stored in the column identified in step S206.

Subsequently, in step S208, the collision locating unit 313 identifies the column that contains the extracted ticket information as the column corresponding to processing that is the cause of the failure of the updating processing from among all access-related information stored in the access-related storing unit 302. Subsequently, in step S209, the collision locating unit 313 extracts the processing ID, process name, and local ID contained in the identified column. Then, in step S210, the collision locating unit 313 stores, as result information, the processing ID and process name of the processing in which updating processing of its CI is unsuccessful extracted in step S203 and the processing ID, process name, and local ID extracted in step S209 such that they are associated with each other in the result storing unit 303.

Subsequently, in step S211, the collision locating unit 313 determines whether another processing in which updating processing of its CI is unsuccessful is contained in the access-related information extracted in step S201. If it is determined that another processing in which updating processing is unsuccessful is contained (YES in step S211), the collision locating unit 313 moves the processing to step S203. If no another processing in which updating processing is unsuccessful is contained (NO in step S211) or if it is determined in step S202 that no processing in which updating processing is unsuccessful is contained in the access-related information (NO in step S202), the collision locating unit 313 moves the processing to step S212.

In step S212, the collision locating unit 313 determines whether steps S202 to 8211 have been performed on all of the access-related information items stored in the access-related storing unit 302. If there is an unprocessed access-related information item (NO in step S212), the collision locating unit 313 moves the processing to step S201. If it is determined that all of the access-related information items has been processed (YES in step S212), the collision locating unit 313 moves the processing to step S213.

In step S213, the result showing unit 314 displays the result information stored in the result storing unit 303 in step S210 on the display. Specifically, the result showing unit 314 displays the possibility of the occurrence of a collision between the processing extracted in step S203 and the processing extracted in step S209 on the display. After the completion of step S213, the collision locating unit 313 finishes the processing of locating a collision.

As described above, with the present embodiment, processing and a process that contains the processing with which processing in which its setting processing on the CMDB 201 is unsuccessful has collided is estimated by analysis of execution history information and setting history information associated by ticket information. This enables estimation of a collision of setting attempts that is difficult to know at the time of process design and also can avoid subsequent similar collisions by taking measures on the estimated processing. Therefore, the incidence of troubles can be reduced.

With the present embodiment, access-related information is generated on the basis of execution history information acquired from the process execution apparatus 1 and setting history information acquired from the CMDB management apparatus 2, and processing that is the cause of failure of setting processing is estimated by use of the generated access-related information. Therefore, the procedural steps for the processing of locating a collision can be simplified, and result information can be more promptly provided to a user of the process analyzing apparatus 3.

Figure 15:
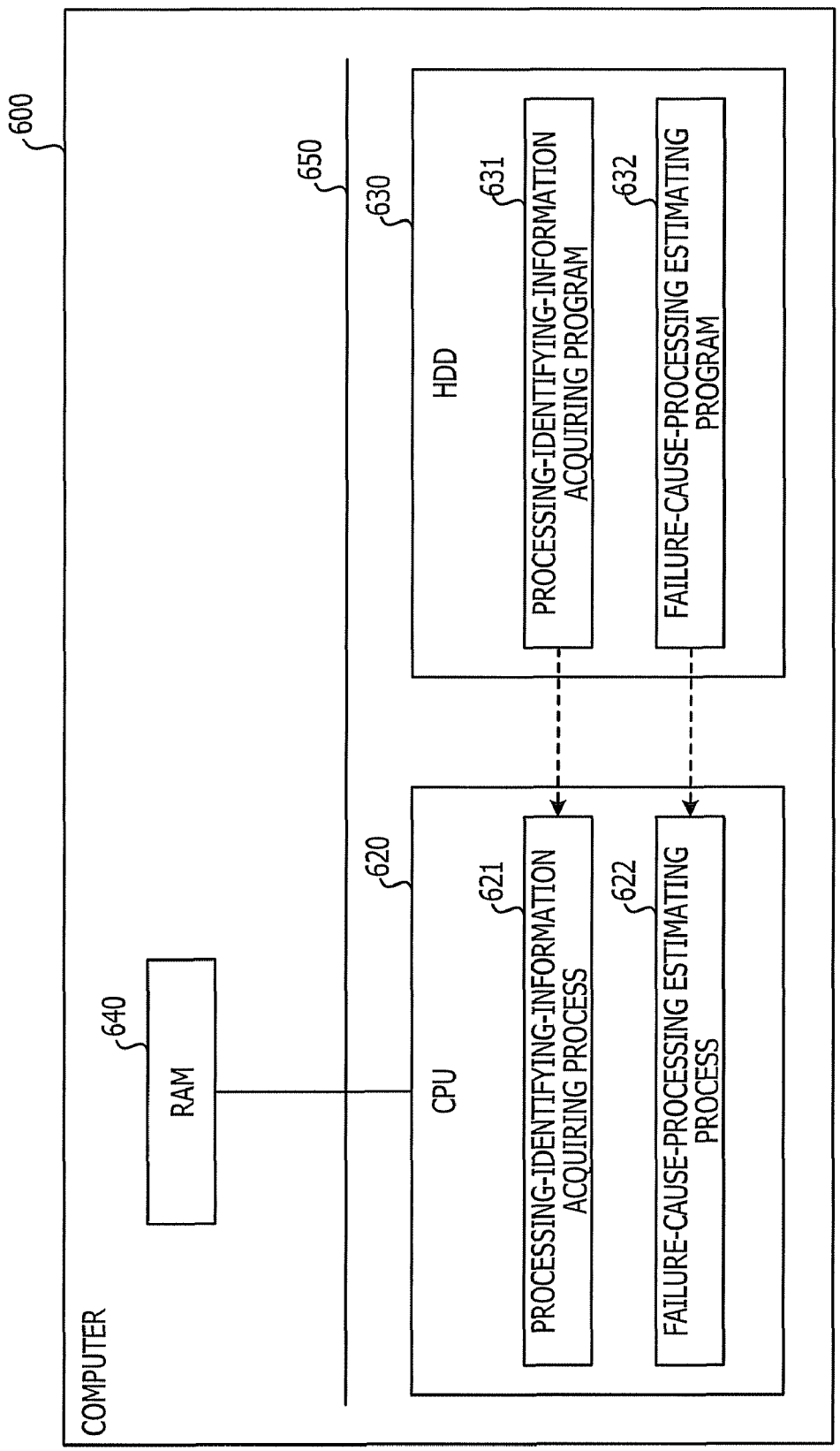
FIG. 15 illustrates a computer that executes a process analysis program.
Figure 16:
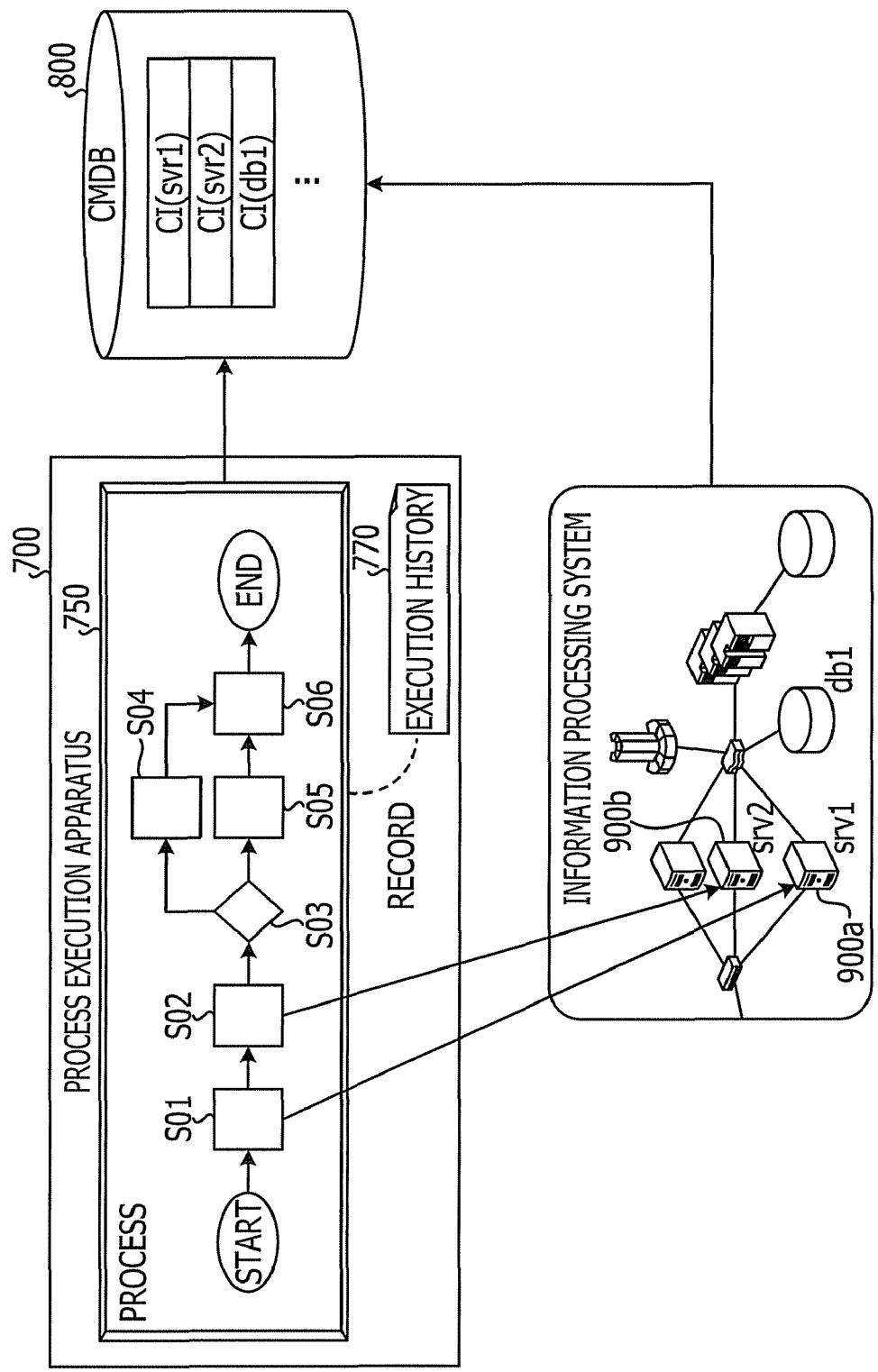
FIG. 16 is an illustration for use in describing an example of a traditional operational task.
Figure 17:
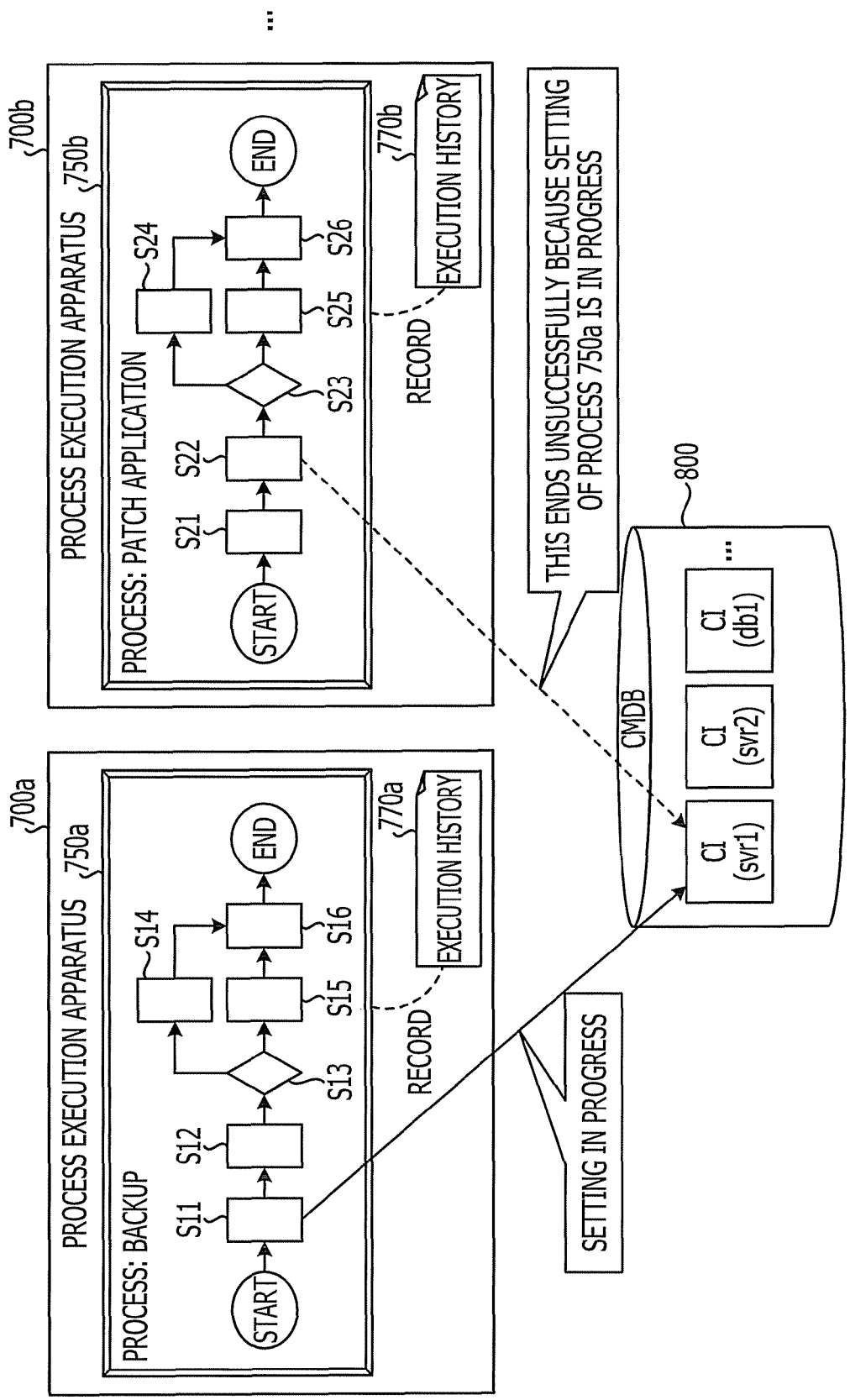
FIG. 17 is an illustration for use in describing how a collision of setting processing attempts for a CI on a CMDB between a plurality of process execution apparatuses occurs.

The processing described in the above embodiment can be achieved by execution of a prepared program by a computer. One example of a computer that executes a process analysis program having substantially the same functions as in the process analyzing apparatus 3 illustrated in the above embodiment is described below using FIG. 15. FIG. 15 illustrates one such example computer that executes a process analysis program.

As illustrated in FIG. 15, a computer 600 is configured such that a central processing unit (CPU) 620, a hard-disk drive (HDD) 630, and a random-access memory (RAM) 640 are connected to one another with a bus 650.

In the HDD 630, a process analysis program that carries out substantially the same functions as in the above embodiment, i.e., a processing-identifying-information acquiring program 631 and a failure-cause-processing estimating program 632 are stored in advance.

The CPU 620 reads the programs 631 and 632 from the HDD 630 and executes them, thereby enabling the programs 631 and 632 to function as a processing-identifying-information acquiring process 621 and a failure-cause-processing estimating process 622.

In the HDD 630, various kinds of data to be utilized by the processes 621 and 622 are stored. The CPU 620 reads the various kinds of data from the HDD 630 and stores them in the RAM 640. Using the various kinds of data stored in the RAM 640, the processes 621 and 622 execute various kinds of processing, such as the processing of locating a collision.

The above process analysis program is not necessarily stored in the HDD 630 and may be stored in a ROM, RAM or other devices as recording mediums. The program stored in a compact-disk read-only memory (CD-ROM) as a recording medium, may be read and executed by the computer 600. The program may be stored in another device (e.g., computer or server), as recording mediums, connected to the computer 600, and the computer 600 may read the program therefrom over a public circuit, the Internet, a local area network (LAN), or a wide area network (WAN) and execute it.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. An operation management system, comprising:
    a process execution apparatus for executing a process on a management target;
    an information management apparatus for managing information regarding the management target as management information; and
    a process analyzing apparatus,
    the process execution apparatus including:
        a setting-information transmitting unit, for each processing contained in the process, transmitting, as setting information, an update request to update the management information for the management target for the processing in accordance with the content of the processing together with processing identifying information for identifying the processing to the information management apparatus; and
        an execution-history storing unit storing, as execution history information, an execution history of each processing contained in the process in association with the processing identifying information corresponding to the processing,
    the information management apparatus including:
        a management-information updating unit updating the management information on the basis of the setting information acquired from the process execution apparatus; and
        a setting-history storing unit storing, as setting history information, an update date and time being the date and time when updating processing of the management information was executed by the management-information updating, management-target identifying information for identifying the management target corresponding to the management information being the target for the updating processing, and update-result information indicating that the updating processing is successful or unsuccessful in association with the processing identifying information contained in the setting information,
    the process analyzing apparatus including:
        a processing-identifying-information acquiring unit acquiring, from the setting history information, processing identifying information that is associated with the same management-target identifying information as management-target identifying information associated with update-result information indicating that the updating processing is unsuccessful and that is associated with an update date and time within a specific period of time from the update date and time associated with the update-result information indicating that the updating processing is unsuccessful; and
        a failure-cause-processing estimating unit determining, from the execution history information, processing corresponding to the processing identifying information acquired by the processing-identifying-information acquiring as the processing that is the cause of the failure of the processing corresponding to the processing identifying information associated with the update-result information indicating that the updating processing is unsuccessful.

2. A process analyzing apparatus for analyzing an execution history of a process executed by a process execution apparatus for executing the process on a management target, the process analyzing apparatus comprising:
    a processing-identifying-information acquiring unit acquiring, from setting history information in which an update date and time being the date and time when updating processing of updating management information for the management target on which each processing contained in the process is executed in accordance with the content of the processing, update-result information indicating that the updating processing is successful or unsuccessful, and management-target identifying information for identifying the management target are associated with processing identifying information for identifying the processing, processing identifying information that is associated with the same management-target identifying information as management-target identifying information associated with update-result information indicating that the updating processing is unsuccessful and that is associated with processing identifying information associated with an update date and time within a specific period of time from the update date and time associated with the update-result information indicating that the updating processing is unsuccessful; and
    a failure-cause-processing estimating unit determining, from execution history information in which an execution history of each processing contained in the process is associated with the processing identifying information corresponding to the processing, processing corresponding to the processing identifying information acquired by the processing-identifying-information acquiring as the processing that is the cause of the failure of the processing corresponding to the processing identifying information associated with the update-result information indicating that the updating processing is unsuccessful.

3. The process analyzing apparatus according to claim 2, further comprising:
    an access-related information generating unit, for each processing identifying information contained in the execution history information, extracting management-target identifying information and update-result information associated with the same processing identifying information as each processing identifying information contained in the execution history information from the setting history information and generating access-related information in which the extracted management-target identifying information and update-result information are associated with the processing identifying information; and a failure-processing extracting unit extracting, from the access-related information generated by the access-related information generating means, the processing identifying information associated with the update-result information indicating that the updating processing is unsuccessful.

4. A non-transitory recording medium in which a process analysis program for analyzing an execution history of a process executed by a process execution apparatus for executing the process on a management target is recorded, the process analysis program causing a computer to execute:

processing-identifying-information acquiring, from setting history information in which an update date and time being the date and time when updating processing of updating management information for the management target on which each processing contained in the process is executed in accordance with the content of the processing, update-result information indicating that the updating processing is successful or unsuccessful, and management-target identifying information for identifying the management target are associated with processing identifying information for identifying the processing, processing identifying information that is associated with the same management-target identifying information as management-target identifying information associated with update-result information indicating that the updating processing is unsuccessful and that is associated with processing identifying information associated with an update date and time within a specific period of time from the update date and time associated with the update-result information indicating that the updating processing is unsuccessful; and failure-cause-processing estimating, from execution history information in which an execution history of each processing contained in the process is associated with the processing identifying information corresponding to the processing, processing corresponding to the processing identifying information acquired in the processing-identifying-information acquiring as the processing that is the cause of the failure of the processing corresponding to the processing identifying information associated with the update-result information indicating that the updating processing is unsuccessful.

* * * * *